March 3, 1942. J. R. HOLMES 2,275,107
RADIATOR TANK FITTING
Filed March 11, 1939
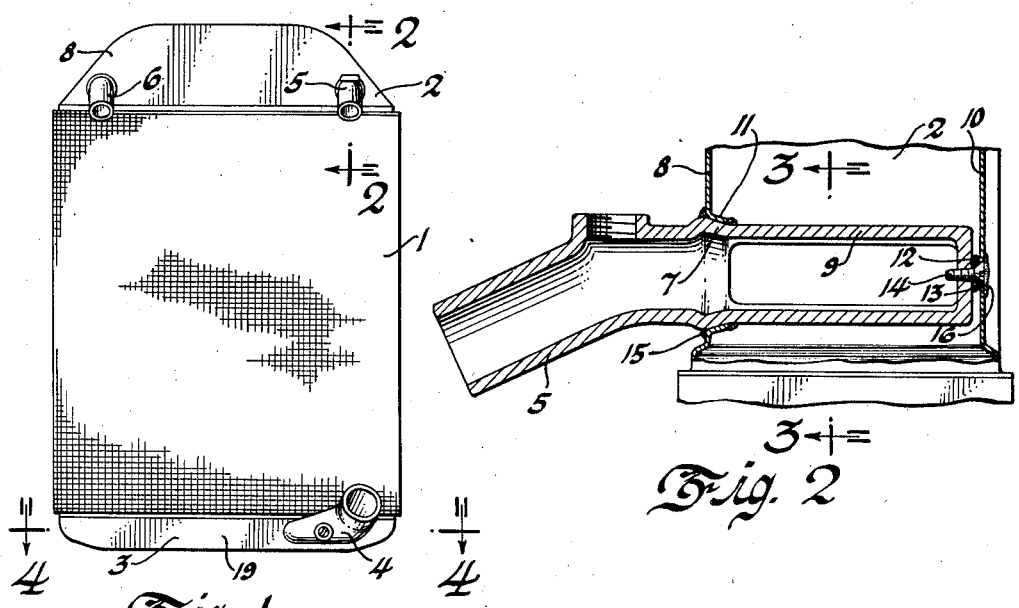
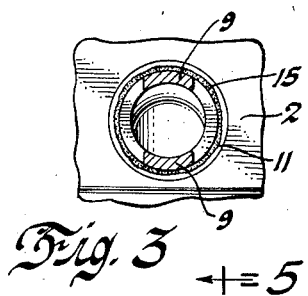
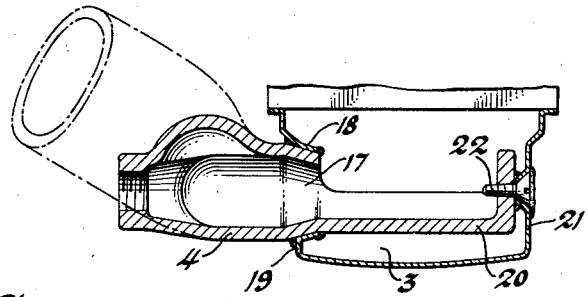
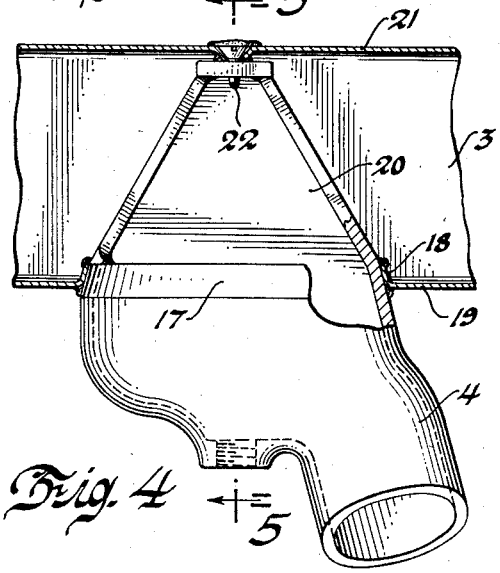
Inventor
John Ralph Holmes
By Blackmor, Spencer & Hunt
Attorneys Patented Mar. 3, 1942

2,275,107

UNITED STATES PATENT OFFICE 2,275,107

RADIATOR TANK FITTING

John Ralph Holmes, Lockport, N. Y., assignor to General Motors Corporation, Detroit, Mich., a corporation of Delaware Application March 11, 1939, Serial No. 261,216

1 Claim. (Cl. 285—5)

This invention relates to engine cooling systems and more particularly to an improved header and fitting assembly. When cast iron fittings are secured by solder joints to the customary sheet metal tanks, leaks may develop in the joint because of the difficulty of bonding solder to cast iron. With this in mind an object of the present invention is to provide a more reliable and secure connection in which any solder employed will serve primarily as a sealing filler. Accordingly, it is proposed in a preferred embodiment of the invention to provide a cast iron fitting having a tapered abutment for wedging contact with a mating seat on one wall of the sheet metal tank with a fitting extension projecting into the tank to adjacent the opposite tank wall to which it is clamped by a fastening screw under tension.

A more complete understanding of the structure will be had upon reference to the accompanying drawing wherein Figure 1 is an elevation of a radiator; Figure 2 is an enlarged section of an inlet fitting taken on line 2—2 of Figure 1; Figure 3 is a transverse section taken on line 3—3 of Figure 2; Figure 4 is a view partly in section of the outlet fitting taken on line 4—4 of Figure 1 and Figure 5 is a sectional view on line 5—5 of Figure 4.

The radiator assembly includes a core 1, a top tank or inlet header 2 and an outlet or lower tank 3. The lower tank is shown with an outlet fitting 4 for coupling to a hose leading to the cooling jacket of the engine. A pair of inlet fittings 5 and 6 are associated with the top tank 2 for connection through hoses with the two cylinder blocks of a V-type engine. The several fittings are of cast iron while the inlet and outlet tanks are stamped from sheet metal.

As seen particularly in Figure 2 the inlet fitting 5 is formed with a tapered shoulder or seating abutment 7 to engage the rear wall 8 of the top tank 2 and from which an integral extension 9 projects into the tank to a point adjacent the opposite wall 10 of the tank 2. The sides of the extension 9 are cut away for the discharge into the tank of cooling liquid delivered to the fitting 5. The opening in the wall 8 which receives the fitting, is bounded by an inturned inwardly tapered or frusto-conical flange 11 to fit the tapered seat 7 and in line with this opening the opposite wall 10 is pierced and provided with an inturned tapered flange 12 in which is seated the head 13 of a fastening screw 14 threaded into the end of the extension 9. A hardened self-tapping screw may be used or optionally a threaded hole may be formed in the extension 9 to receive a fastening stud. In either event the proportion of the parts is such that when the screw is drawn up tight it is under tension which places the walls 8 and 10 under stress and insures a tight fit between the seating surfaces of the tapered abutments 7 and 11. Further to insure a good fit the machining of the cast iron fitting includes the grinding off of rough spots on the tapered portion 7 and the whole is given a protective coating of tin. A sealing filler 15 of solder is applied around the joint between the fitting and wall 8 and some of the solder will flow between the abutting surfaces by capillarity to complete the seal. Similarly sealing solder 16 is applied about the screw 14 where it passes through the sheet metal wall 10.

The attachment of the other fittings is similar to that just described. The outlet fitting, however, is somewhat of larger size than the inlet fitting and instead of being of circular section has an oblong cross section, as seen in Figures 4 and 5. A tapered seating shoulder 17 is fitted to a similarly shaped seating flange 18 in the adjacent wall 19 of the lower tank 3 and a triangular shaped extension 20 of the fitting projects to the opposite wall 21 to which it is fastened by the tensioning connector 22 to insure a wedging fit of the tapered portion 17 and 18.

Because of the mechanical connection between the cast iron fitting and the sheet metal tank the parts will be securely anchored and held against strain such as ordinarily might break a solder joint and result in leakage.

I claim:

In a radiator for engine cooling systems, a header comprising a tank having sheet metal walls spaced apart to define header space therebetween and means tying together and strengthening said sheet metal walls including a laterally projecting hose fitting having an extension inserted through the inner tank wall into engagement with the outer tank wall, an inwardly tapered seat on the fitting engaging a correspondingly tapered flange on the inner sheet metal wall, means connecting said extension to the outer wall and holding the tapered seating surfaces tightly wedged against outward displacement and a soldered attachment bond between the tapered surfaces to hold the wall against inward collapse.

JOHN RALPH HOLMES.